United States Patent [19]

Naito et al.

[11] Patent Number: 5,557,181
[45] Date of Patent: Sep. 17, 1996

[54] BRAKE CONTROL APPARATUS FOR ELECTRIC MOTOR VEHICLE

[75] Inventors: Shotaro Naito, Katsuta; Sanshiro Obara, Tokai-mura; Nobuyoshi Mutoh, Katsuta, all of Japan

[73] Assignee: Hitachi, Ltd., Japan

[21] Appl. No.: 123,105

[22] Filed: Sep. 20, 1993

[30] Foreign Application Priority Data

Sep. 18, 1992 [JP] Japan .................................. 4-249140

[51] Int. Cl.$^6$ ........................................... H02D 1/00
[52] U.S. Cl. ............................ 318/376; 318/139; 320/43
[58] Field of Search ................................... 318/362, 138, 318/254, 376, 432, 139; 290/45, 50; 180/65.2, 65.3, 65.1, 65.4, 242, 243; 307/149; 363/37; 320/43, 13, 57

[56] References Cited

U.S. PATENT DOCUMENTS

| | | | |
|---|---|---|---|
| 3,790,816 | 2/1974 | Berman | 307/149 |
| 3,808,481 | 4/1974 | Rippel | 318/138 |
| 4,199,037 | 4/1980 | White | 180/65.3 |
| 4,310,793 | 1/1982 | Sheldrake et al. | 322/28 |
| 4,342,955 | 8/1982 | Gant | 322/25 |
| 4,351,905 | 9/1982 | Fields et al. | 318/139 |
| 4,724,332 | 2/1988 | Finger | 361/92 |
| 5,172,006 | 12/1992 | Suzuki et al. | 290/45 |
| 5,176,213 | 1/1993 | Kavai et al. | 180/65.2 |
| 5,293,308 | 3/1994 | Boys et al. | 363/37 |
| 5,345,154 | 9/1994 | King | 318/49 |

FOREIGN PATENT DOCUMENTS 57-211904  12/1982  Japan .
61-262006  11/1986  Japan .

Primary Examiner—John W. Cabeca
Attorney, Agent, or Firm—Evenson, McKeown, Edwards & Lenahan P.L.L.C.

[57] ABSTRACT

The invention provides a brake control apparatus for an electric motor vehicle that can control a charging current depending on a charging state of a dc power supply to avoid overcharging it. In regenerative braking, according to the invention, the charging state of a battery is detected by a charging state detector, which sends a detection signal to a control unit. When the state of charge of the battery exceeds a predetermined level, the control unit controls operating parameters of an inverter so that the charging current to the battery is decreased. If, however, insufficient torque results, the control unit turns on an electric load to increase the control torque. If further load absorption is needed, the control unit turns on electric braking means.

28 Claims, 5 Drawing Sheets

BRAKE CONTROL APPARATUS FOR ELECTRIC MOTOR VEHICLE

BACKGROUND OF THE INVENTION

The present invention relates to a brake control apparatus for an electric motor vehicle having a battery and a motor used therein.

Electric motor vehicles conventionally have a battery (dc power supply), an inverter for converting dc power from the battery to ac power, an ac motor driven by the ac power from the inverter, and a control section for controlling the inverter. In prior art electric motor vehicles, the inverter, which is controlled in response to a command signal from an accelerator of the vehicle, in turn controls a rotational speed and other operating parameters of the ac motor. In braking, the motor is regenerative-braked according to a command signal from an electric braking control unit, thus supplying a charging current to the battery. Japanese Patent Application Laid-Open No. 57-211904 and 61-262006, for example, discloses such a control unit for regenerative braking.

While charging of the vehicle battery during regenerative braking such as occurs in prior art electric vehicles can be a useful feature, it can also be harmful. That is, for example, when the battery is already fully charged, it can become overcharged, thereby possibly damaging it.

In view of the foregoing, it is an object of the present invention to provide a brake control apparatus for an electric motor vehicle which can control the charging current to a battery based on the charging state of the battery, thereby avoiding over-charging the battery.

SUMMARY OF THE INVENTION

Briefly, the foregoing object is accomplished in accordance with aspects of the present invention by an electric vehicle brake control apparatus which has charging state detection apparatus for detecting a charging state of the dc power supply, and which operates the power conversion means according to a detection signal from the charging state detection means to adjust a charging current to the dc power supply. In a preferred embodiment, the brake control apparatus according to the invention comprises an electric load through which the charging current can be shunted, depending on a control torque upon braking the motor. In another embodiment, electric braking apparatus is also provided, and the control section shunts the charging current through either of the electric load or the electric braking means (or both).

Preferably, the power conversion means is a semiconductor inverter and the motor is a three-phase ac motor.

Also, the charging state detection unit is preferably configured to detect the charging state of the dc power supply by detecting its voltage at a predetermined charging or discharging current.

This charging state detection unit according to the invention can detect the state of charge of the dc power supply to prevent it from being overcharged. If the dc power supply is fully charged during regenerative braking of the electric motor vehicle, the control section controls the power inversion means to limit the charging current to the dc power supply. If however, the control torque becomes insufficient at that time, the current is shunted through an electric load or electric braking means to maintain the necessary control torque. In this manner, the brake control apparatus according to the invention controls the charging current based on the charging state of the dc power supply, to avoid an overcharge of the dc power supply.

Other objects, advantages and novel features of the present invention will become apparent from the following detailed description of the invention when considered in conjunction with the accompanying drawings.

DETAILED DESCRIPTION OF THE DRAWINGS

Figure 1:
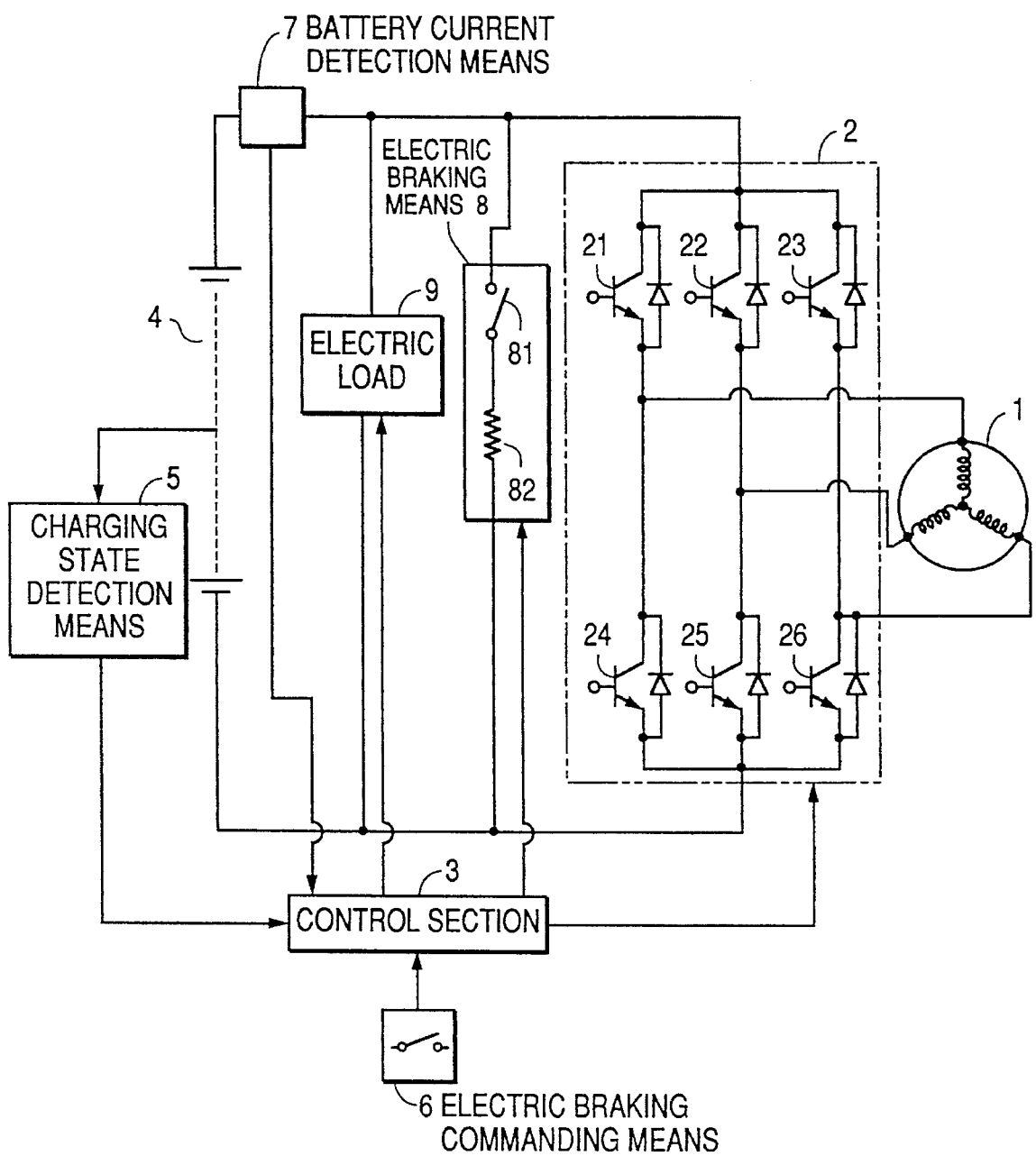
FIG. 1 is a partially schematic circuit diagram of a brake control apparatus for an electric motor vehicle according to the present invention.

FIG. 1 is a circuit diagram of a brake control apparatus for an electric motor vehicle according to the present invention, which includes a rechargeable battery 4, having an electric load 9 and an electric braking means 8 connected in parallel therewith. (The electric braking means 8 comprises a switch 81 and a resistor 82 connected in series thereto.) A voltage inverter 2 which drives a three phase a.c. motor 1, is also connected in parallel with the battery 4. The voltage inverter 2 is a three-phase semiconductor inverter having transistors 21–26.

Figure 3:
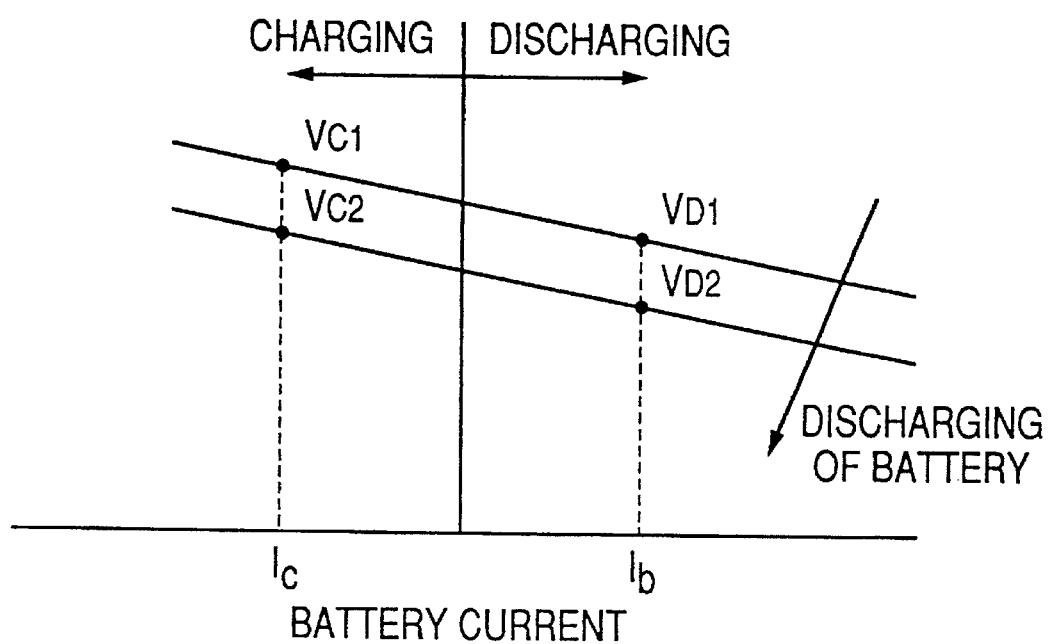
FIG. 3 shows the relationships between the battery charging states and battery voltage and current.

A battery current detector 7 detects the charging current delivered to the battery 4, while a charging state detector 5 detects the charging state of the battery 4. The charging state detector 5 determines the charging state of the battery 4 by detecting its voltage when it is charged or discharged at a specific current, as shown in FIG. 3. That is, during charging, the charging state detector 5 determines that the battery 4 is fully charged if the voltage of the battery 4 at a charging current Ic is VC1 or greater, and that it is not yet discharged if the voltage is at least VC2. During discharging, the charging state detector 5 determines that the battery 4 is still charged if the voltage of the battery 4 at a discharging current Ib is VD1, and that it is discharged if the voltage is VD2 or less. (Other methods known to those skilled in the art may also be used to evaluate the state of charge, such as comparing the battery voltage with a known standard cell voltage, calculating cumulative charge and discharge currents in amp-hours, and the like.)

Referring again to FIG. 1, an electric braking command unit 6 generates a braking command signal. A control section 3 receives the command signal and controls the voltage inverter 2, the electric braking means 8, and the electric load 9. (The electric load in this case may consist of electrically driven auxiliary equipment of the vehicle, such as air conditioner, heater, interior lights, and the like.)

Figure 2:
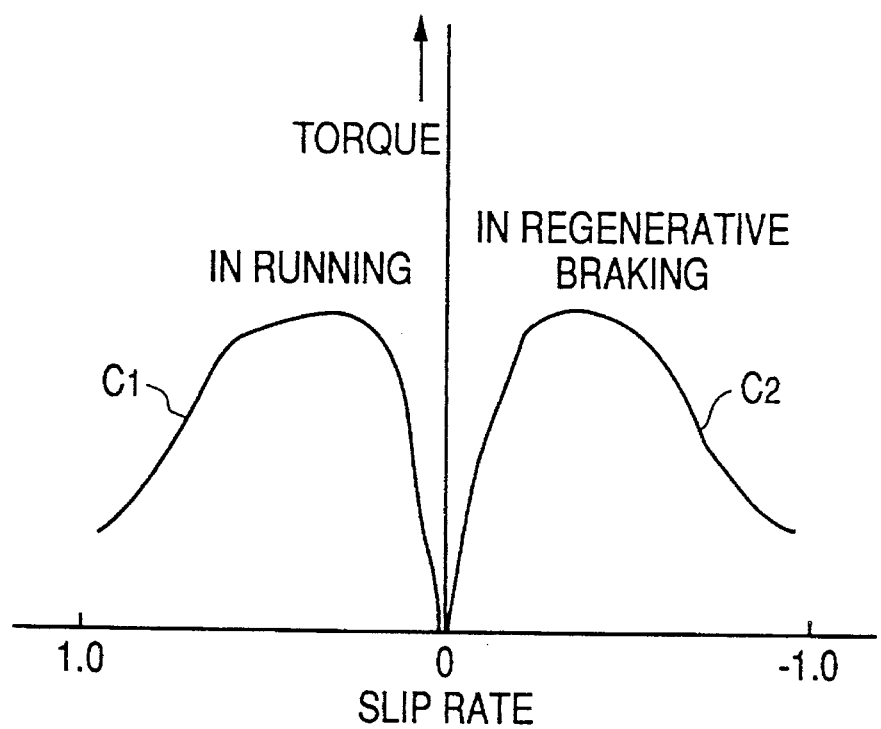
FIG. 2 is a graphic depiction of the relationship between torque and slip rate according to the running state of a motor.

During operation of the electric motor vehicle, the control section 3 sends a command signal to the transistors 21–26 of the voltage inverter 2, which supplies a three-phase ac Voltage to drive the three-phase motor 1. FIG. 2 shows a torque curve C1 which depicts the relationship between the torque applied to or generated by the a.c. induction motor 1 and the slip rate thereof in the running states. During normal operation (without braking), the vehicle is driven in a positive state of the slip rate. As used herein "slip" refers to the difference between the rotational speed of the rotor and synchronous speed (frequency of rotating field), expressed as a decimal fraction or a percentage of the latter.

In electric braking, the control section 3 controls the inverter 2 according to the command signal from the electric braking commanding means 6 in a manner well known to those skilled in the art. As shown in FIG. 2, when electric braking is performed, the vehicle is driven in a negative state of the slip rate, and a regenerative current is made to flow to the battery 4 through the inverter 2. The charging current to the battery 4 is detected by the battery current detection means 7, which provides an output signal indicative thereof to the control section 3. The control section 3 then controls the inverter 2 in a manner discussed hereinafter (FIG. 4), so that the charging current assumes a predetermined value.

Also during regenerative braking, the charging state of the battery 4 is detected by the charging state detector 5 which provides a detection signal to the control section 3. While the battery 4 is in the charging state (as shown in FIG. 3), the control section 3 controls the inverter 2 so as to decrease the charging current to the battery 4, depending on the state of charge of the battery 4. It may, however, occur that with the current reduced in this manner simply by controlling the inverter 2, the energy supplied by inverter 2 to the a.c. motor is insufficient to generate a required control (braking) torque. In that event, the control section 3 feeds a turn-on signal to the electric load 9 to shunt a part of the charging current through it. The electric load 9 thus absorbs the load to increase the control torque.

If further load absorption is needed, the control section 3 sends a turn-on signal to the electric braking means 8, and the switch 81 is turned on to connect the resistor 82 in parallel with the inverter 2. This shunts a part of the current also through the resistor 82 to consume power, so that the required control torque can be generated in the three-phase motor 1.

As described above, the present invention has the charging state detection means 5 to detect the charging state of the battery 4 in braking the electric motor vehicle. The control section 3 can control the inverter 2 in such a manner as to decrease the charging current depending on the charging state of the battery 4, so that the battery 4 should not be overcharged, thereby preventing it from being damaged. If, however, such control of the inverter 2 would cause the control torque of the a.c. motor to be insufficient to provide the required braking, the electric load 9 or the electric braking means 8 is made to consume the power to avoid insufficiency of the control torque required for the three-phase motor 1. Either or both of the electric load 9 and the electric braking means 8 can be connected in parallel with the battery 4.

Detection of the charging state of the battery 4 can, of course, be performed in a manner other than the one shown in FIG. 3. Moreover, the inverter 2 in the embodiment described above is not limited to the three-phase semiconductor inverter, as shown, since it is possible to use other voltage inversion means.

Figure 4:
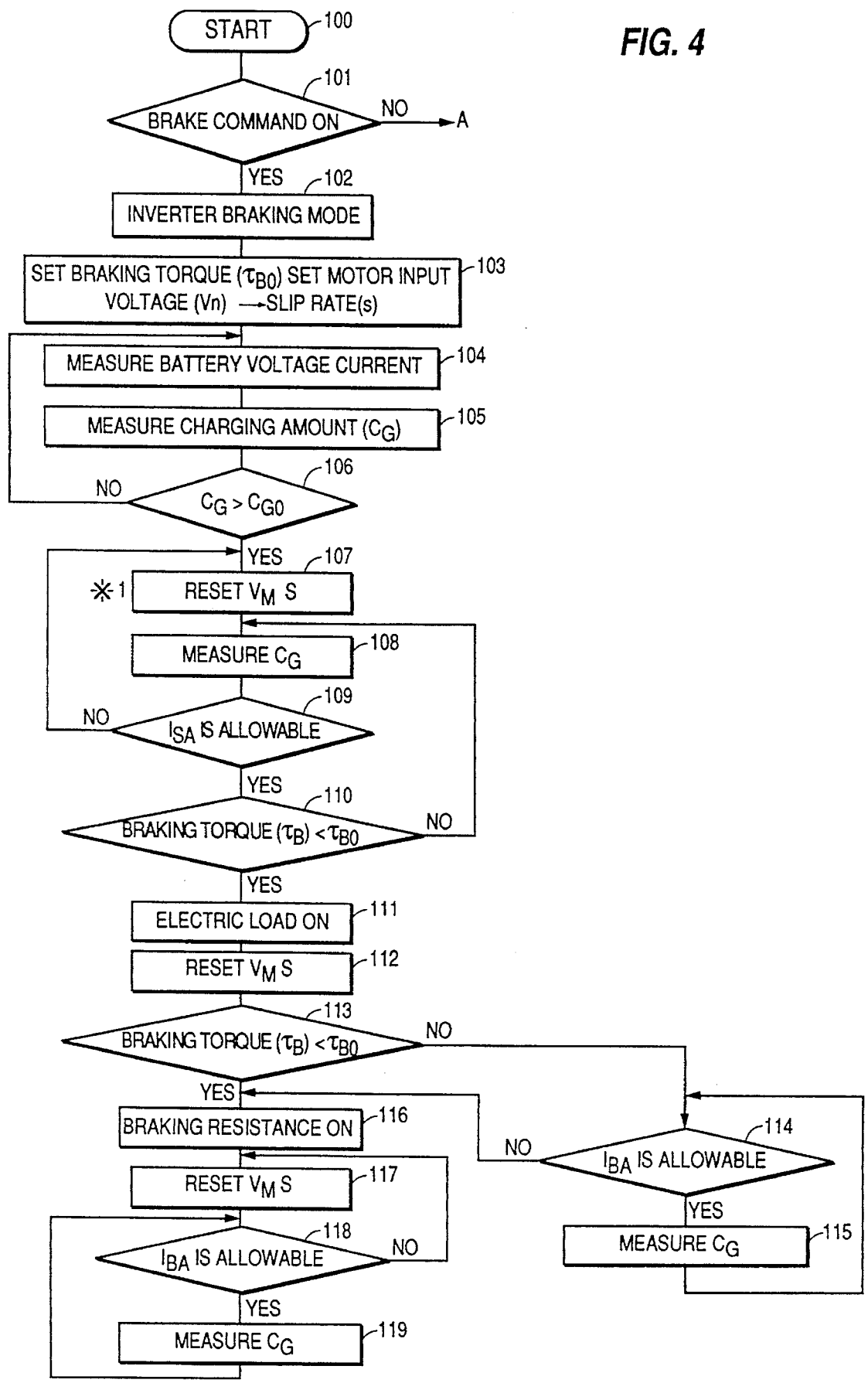
FIG. 4 is a flow chart that illustrates the operation of the brake control apparatus according to the invention.
Figure 5A:
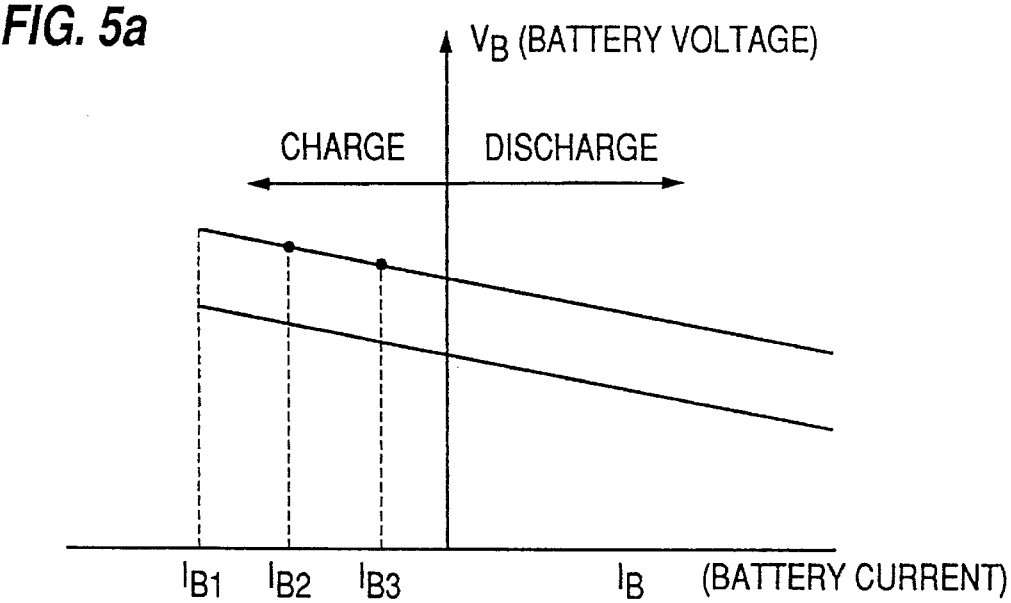
FIGS. 5.a–5.f are graphic illustrations of operating parameters referred to in FIG. 4.
Figure 5B:
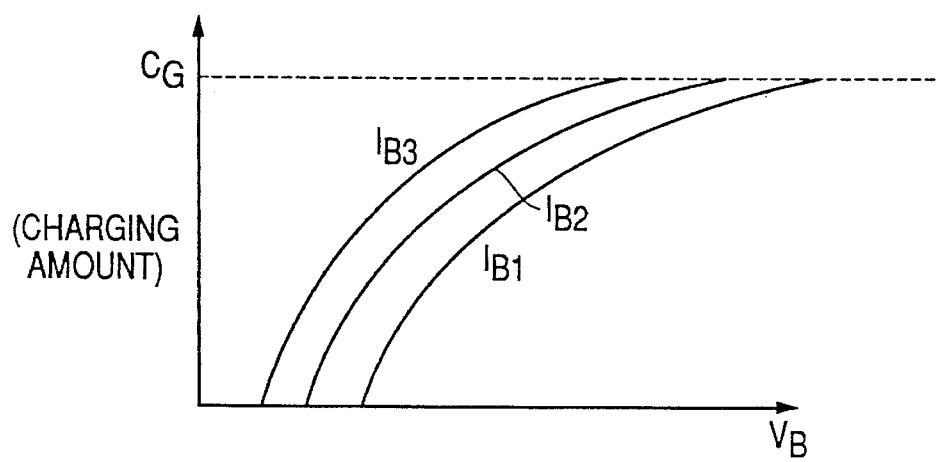
Figure 5C:
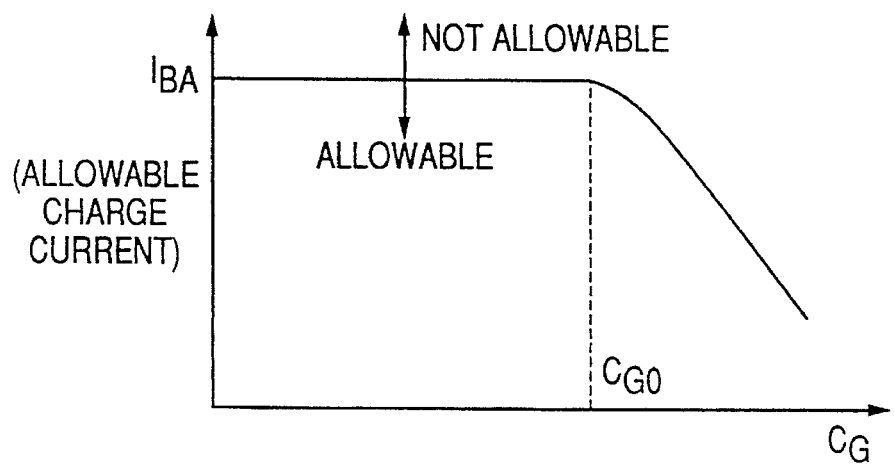
Figure 5D:
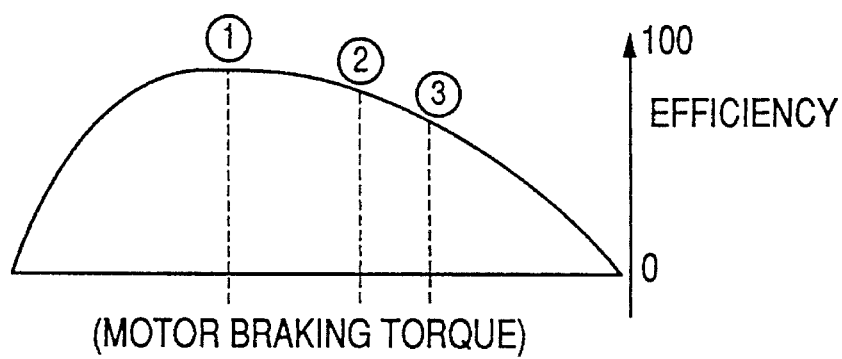
Figure 5E:
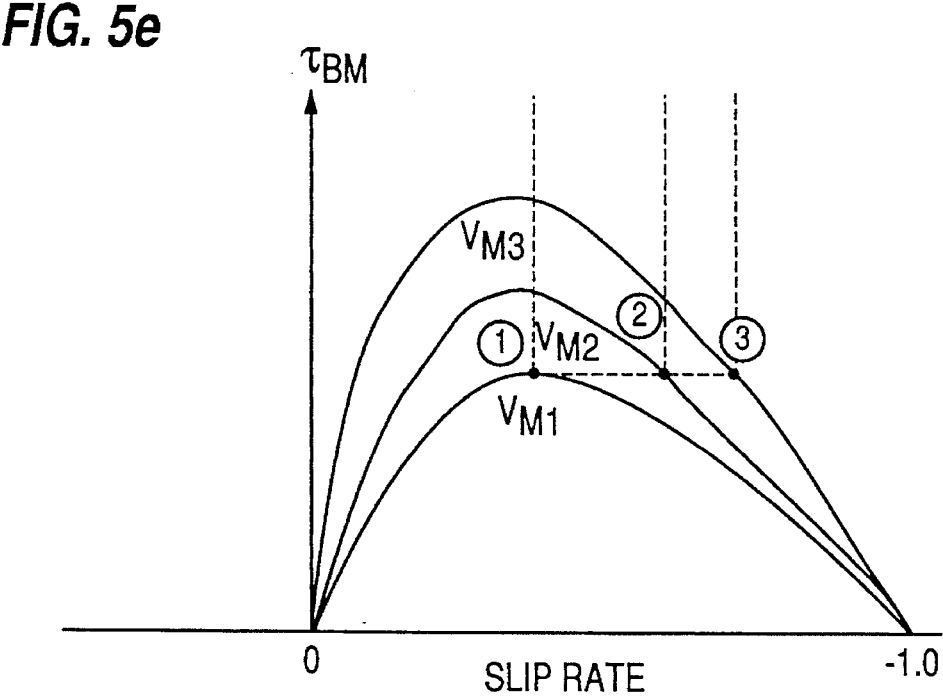
Figure 5F:
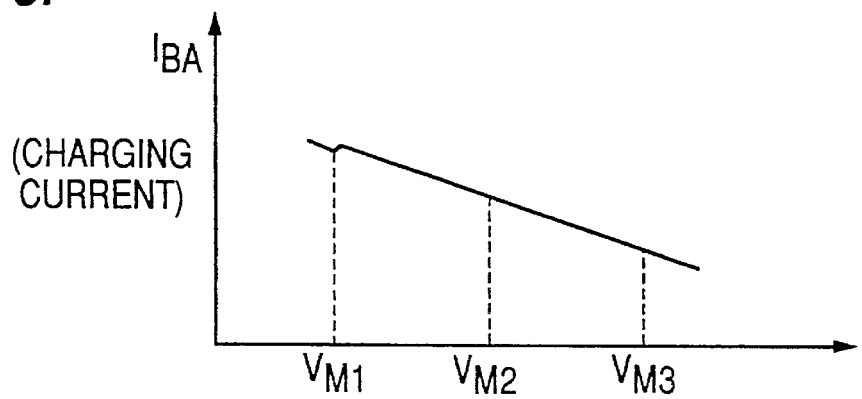

FIG. 4 is a flow chart which illustrates the operation of the invention, including the control function performed by control section 3. At step 101 a determination is made whether a brake command signal has been received by the control section 3 from the brake command unit 6. If so, the inverter 2 is set in the inverter braking mode at step 102, and predetermined values for braking torque $\tau_{BO}$, motor input voltage $V_m$ and slip rate S are set at step 103. The Battery Voltage $V_{BA}$, and Current $I_{BA}$ are then measured (step 104) and the state of charge $C_G$ of the battery 4 is determined (step 105), as described previously. In step 106 a determination is made whether the state of charge $C_G$ is greater than a predetermined target value $G_{GO}$. If it is not, steps 104 and 105 are repeated so long as $C_G$ remains below the target. If $C_G > C_{GO}$ (the battery charge exceeds a permissible level), the operating point of the motor 1 is adjusted in step 107 to a less efficient state by changing $V_m$ and S (FIGS. 5.d, 5.e and 5.f), which has the effect of reducing the charging current $I_{BA}$. Battery charge $C_G$ is then measured in the manner described previously (step 108) and a determination is made (step 109) whether $I_{BA}$ is less than an allowable limit as shown in FIG. 5C. If it is not, then steps 107 through 109 are repeated to further reduce $I_{BA}$ until it is within the allowable limit.

Next in step 110 a determination is made whether the magnitude of the resulting braking torque $\tau_B$ after steps 107–109 is less than a predetermined target $\tau_{BO}$. It is not (that is, braking torque remains at an acceptable level), then steps 108–110 are repeated. If, on the other hand, the reduction of $I_{BA}$ in steps 107–109 has caused braking torque to fall below the target $\tau_{BO}$ in step 110, then the electric load 9 is turned on in step 111, the operating point of the motor is reset in step 112 and braking torque is evaluated again in step 113. If it remains below the target $\tau_{BO}$, then the braking resistance 8 is activated in step 116 and the operating point of the motor is again adjusted (step 117). A determination is then made in step 118 whether $I_{BA}$ remains at an acceptable level (FIG. 5.c). If not, steps 117 and 118 are repeated; if it is acceptable, the state of charge of battery 4 is measured, in step 119 and step 118 is repeated.

If braking torque is above the target value $\tau_{BO}$ in step 113, then a determination is made whether battery current $I_{BA}$ is allowable (FIG. 5.c). If so, $C_G$ is measured at step 115, and step 114 is repeated. If $I_{BA}$ falls below an allowable level, processing proceeds to step 116 as described above.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Apparatus for operating an electric motor system having a motor, a power supply unit coupled to provide electric power to said motor, a control unit which controls said power supply unit and a rechargeable power source coupled to provide electric power to said power supply unit, said power supply unit being operable to output an electric charging current to said rechargeable power source when said power supply unit is driven by said motor, said apparatus comprising:

a charge state detector for detecting a charge state of said rechargeable power source and for providing a charge state signal indicative of said charge state at a particular charging current;

a current detector for detecting said particular charging current and providing a current signal indicative thereof; and at least one electric load element coupled to divert said charging current from said rechargeable power source:

said control unit being coupled to receive said charge state signal and said current signal, and controlling said charging current by adjusting diversion of said charging current from said rechargeable power source through said at least one electric load element, in response to said charge state signal at said particular charging current.

2. Apparatus according to claim 1 wherein said control unit comprises means for controlling power consumption by said electric load element when said power supply unit is driven by said motor.

3. Apparatus according to claim 1 wherein said at least one electric load element comprises a plurality of electric load elements.

4. Apparatus according to claim 1 wherein said plurality of electric load elements are coupled in parallel to each other and to said rechargeable power source.

5. Apparatus according to claim 1 wherein said control unit includes means for selectively activating said electric load elements to divert said charging current from said rechargeable power source.

6. Apparatus according to claim 5 wherein said electric motor is coupled to drive a vehicle, and wherein at least one of said electric load elements comprises at least one auxiliary electric system of said vehicle.

7. Apparatus according to claim 1 wherein said control unit causes said power consumption of said power supply unit and of said motor to increase when said charge state signal exceeds a first threshold value.

8. Apparatus according to claim 7 wherein said means for controlling said charging current selectively activates said at least one electric load element when said charge state signal exceeds at least a second threshold value.

9. Apparatus according to claim 8 wherein said at least one electric load element comprises a plurality of electric load elements, and wherein said at least a second threshold value comprises a plurality of threshold values.

10. Apparatus according to claim 1 wherein said detector for detecting a charge state comprises means for measuring voltage of said rechargeable power source at a predetermined level of charging or discharging current.

11. Apparatus according to claim 1 wherein said rechargeable power source is a battery.

12. Apparatus according to claim 10 wherein said rechargeable power source is a battery.

13. Apparatus according to claim 1 wherein said control unit comprises:

means for comparing a braking torque of said motor with a predetermined minimum braking torque value; and means for activating a first electric load element to divert said charging current from said rechargeable power source when said braking torque is less than said predetermined minimum value.

14. Apparatus according to claim 13 wherein said control unit further comprises:

means for activating a second electric load element to further divert charging current from said rechargeable power source when said braking torque remains below said predetermined minimum value after activation of said first electric load element.

15. Apparatus according to claim 14 wherein one of said first and second load elements comprises auxiliary electrical systems of said vehicle.

16. Method of operating an electric motor system having a motor, a power supply unit coupled to provide electric power to said electric motor and a rechargeable power source coupled to provide electric power to said power supply unit, said power supply being operable to output an electric charging current to said rechargeable power source when said power supply unit is driven by said motor, said method comprising the steps of:

detecting a state of charge of said rechargeable power source and providing a charge state signal indicative of said charge state at a particular charging current;

detecting said particular charging current and providing a current signal indicative thereof;

controlling said charging current by diverting said charging current from said rechargeable power source to an electric load element and adjusting diverted charging current in response to said charge state signal at said particular charging current signal.

17. Method according to claim 10 wherein said controlling step comprises controlling power consumption by said power supply unit and said motor in response to said charge state signal and said current signal.

18. Method according to claim 16 wherein said controlling step further comprises:

providing at least one electric load element to divert charging current from said rechargeable current source, and controlling flow of charging current through said at least one load element in response to said charge state signal and said current signal.

19. Method according to claim 18 wherein said motor drives a vehicle, and said at least one electric load element comprises at least one auxiliary electrical system of said vehicle.

20. Method according to claim 16 wherein said step of detecting a state of charge of said rechargeable power source comprises:

measuring voltage of said rechargeable power source at a predetermined level of charging or discharging current; and comparing said voltage with a predetermined threshold value.

21. Method according to claim 16 wherein said rechargeable power source is a battery.

22. Method according to claim 16 wherein said step of controlling said charging current comprises:

comparing a braking torque of said motor with a predetermined minimum braking torque value; and activating a first electric load element to divert said charging current from said rechargeable power source when said braking torque is less than said predetermined minimum value.

23. Method according to claim 22 wherein said step of controlling said charging current further comprises:

activating a second electric load element to further divert charging current from said rechargeable power source when said braking torque remains below said predetermined minimum value after activation of said first electric load element.

24. Apparatus for operating an electric motor system having a motor, a power supply unit coupled to provided electric power to said motor, a control unit which controls said power supply unit and a rechargeable power source coupled to provide electric power to said power supply unit, said power supply unit being operable to output an electric charging current to said rechargeable power source when said power supply unit is driven by said motor, said apparatus comprising:

a charge state detector for detecting a charge state of said rechargeable power source and for providing a charge state signal indicative thereof; and a current detector for detecting said charging current and providing a current signal indicative of magnitude thereof;

said control unit being coupled to receive said charge state signal and said current signal, and comprising means for limiting said charging current flowing to said rechargeable power source by activating a first electric load element to divert at least a portion of said charging current from said rechargeable power source if said charge state signal exceeds a first predetermined value at a time when said charging current exceeds a second predetermined value.

25. Apparatus for operating an electric motor system having a motor, a power supply unit coupled to provided electric power to said motor, a control unit which controls said power supply unit and a rechargeable power source coupled to provide electric power to said power supply unit, said power supply unit being operable to output an electric charging current to said rechargeable power source when said power supply unit is driven by said motor, said apparatus comprising:

a charge state detector for detecting a charge state of said rechargeable power source and for providing a charge state signal indicative thereof; and a current detector for detecting said charging current and providing a current signal indicative of magnitude thereof;

said control unit being coupled to receive said charge state signal and said current signal, and comprising means for controlling operating parameters of said power supply unit to decrease said charging current output by said power supply unit whenever said charge state signal exceeds a predetermined level, means for comparing a braking torque of said motor with a required braking torque value, and means for activating a first electric load element to divert at least a portion of said charging current from said rechargeable power source when said braking torque is less than said required value.

26. Method of operating an electric motor system having a motor, a power supply unit coupled to provided electric power to said motor, a control unit which controls said power supply unit and a rechargeable power source coupled to provide electric power to said power supply unit, said power supply unit being operable to output an electric charging current to said rechargeable power source when said power supply unit is driven by said motor, said method comprising the steps of:

detecting a charge state of said rechargeable power source, and providing a charge state signal indicative thereof;

detecting said charging current and providing a current signal indicative of magnitude thereof; and limiting said charging current flowing to said rechargeable power source by activating a first electric load element to divert at least a portion of said charging current from said rechargeable power source if said charge state signal exceeds a first predetermined value at a time when said charging current exceeds a second predetermined value.

27. Method of operating an electric motor system having a motor, a power supply unit coupled to provided electric power to said motor, a control unit which controls said power supply unit and a rechargeable power source coupled to provide electric power to said power supply unit, said power supply unit being operable to output an electric charging current to said rechargeable power source when said power supply unit is driven by said motor, said method comprising the steps of:

detecting a charge state of said rechargeable power source, and providing a charge state signal indicative thereof; and detecting said charging current and providing a current signal indicative of magnitude thereof;

controlling operating parameters of said power supply unit to decrease said charging current output by said power supply unit whenever said charge state signal exceeds a predetermined level;

comparing a braking torque of said motor with a required braking torque value; and activating a first electric load element to divert at least a portion of said charging current from said rechargeable power source when said braking torque is less than said required value.

28. Apparatus for operating an electric motor system having a motor, a power supply unit coupled to provided electric power to said motor, a control unit which controls said power supply unit and a rechargeable power source coupled to provide electric power to said power supply unit, said power supply unit being operable to output an electric charging current to said rechargeable power source when said power supply unit is driven by said motor, said apparatus comprising:

a charge state detector for detecting a charge state of said rechargeable power source and for providing a charge state signal indicative thereof; and a current detector for detecting said charging current and providing a current signal indicative thereof;

said control unit being coupled to receive said charge state signal and said current signal, and comprising means for limiting said charging current by controlling operating parameters of said power supply unit when said power supply unit is driven by said motor, and means for activating a first electric load element to divert said charging current from said rechargeable power source when a braking torque of said motor is less than a required value.

* * * * *